(12) United States Patent
Patel et al.

(10) Patent No.: US 9,424,738 B2
(45) Date of Patent: Aug. 23, 2016

(54) AUTOMATIC UPDATES TO A REMOTE CONTROL DEVICE

(75) Inventors: Mukesh Patel, Fremont, CA (US); Jonathan Logan, Mountain View, CA (US); Amir Gharaat, Menlo Park, CA (US); Richard Lee, San Francisco, CA (US); Roger Hsu, Palo Alto, CA (US); Robert Ponjatowski, San Jose, CA (US); Anthony Lee, San Francisco, CA (US)

(73) Assignee: TiVo Inc., Alviso, CA (US)

( * ) Notice: Subject to any disclaimer, the term of this patent is extended or adjusted under 35 U.S.C. 154(b) by 0 days.

(21) Appl. No.: 13/420,562

(22) Filed: Mar. 14, 2012

(65) Prior Publication Data

US 2012/0178371 A1    Jul. 12, 2012

Related U.S. Application Data

(63) Continuation of application No. 12/842,966, filed on Jul. 23, 2010.

(51) Int. Cl.
 *G05B 11/01*   (2006.01)
 *G08C 17/00*   (2006.01)

(52) U.S. Cl.
 CPC ............ *G08C 17/00* (2013.01); *G08C 2201/20* (2013.01); *G08C 2201/40* (2013.01); *G08C 2201/50* (2013.01); *G08C 2201/92* (2013.01)

(58) Field of Classification Search
 CPC ............... G08C 19/28; G08C 2201/20; G08C 2201/92; G08C 2201/50
 USPC ............ 340/825.72, 12.23; 348/734; 341/176
 See application file for complete search history.

(56) References Cited

U.S. PATENT DOCUMENTS

| | | | |
|---|---|---|---|
| 5,554,980 A | 9/1996 | Hashimoto et al. | |
| 5,671,267 A * | 9/1997 | August | H04M 1/72502 379/102.03 |
| 5,850,340 A | 12/1998 | York | |
| 5,959,539 A * | 9/1999 | Adolph | H04B 1/202 340/10.6 |
| 5,963,624 A * | 10/1999 | Pope | H04M 11/007 348/734 |
| 5,978,046 A | 11/1999 | Shintani | |
| 6,072,492 A | 6/2000 | Schagen et al. | |

(Continued)

FOREIGN PATENT DOCUMENTS

| | | |
|---|---|---|
| JP | 10-155188 | 6/1998 |
| JP | H10174177 A | 6/1998 |

(Continued)

OTHER PUBLICATIONS

U.S. Appl. No. 12/842,966, filed Jul. 23, 2012, Office Action, Jun. 23, 2014.

(Continued)

*Primary Examiner* — Jennifer Mehmood
*Assistant Examiner* — Rufus Point
(74) *Attorney, Agent, or Firm* — Wong & Rees LLP

(57) ABSTRACT

A method includes detecting that a particular media device is communicatively coupled to one or more media devices in a set of media devices; in response to detecting that the particular media device is communicatively coupled to the one or more media devices in the set of media devices: automatically sending one or more remote operating codes, for remotely controlling the particular media device, to a remote control device.

33 Claims, 5 Drawing Sheets

(56) References Cited

U.S. PATENT DOCUMENTS

| | | | |
|---|---|---|---|
| 6,101,428 A * | 8/2000 | Snyder | B60R 25/245 340/425.5 |
| 6,133,847 A * | 10/2000 | Yang | G05B 19/0426 340/12.25 |
| 6,225,938 B1 * | 5/2001 | Hayes | G11B 15/023 235/462.45 |
| 6,239,718 B1 * | 5/2001 | Hoyt | G08C 19/28 340/12.24 |
| 6,243,740 B1 | 6/2001 | Minneman et al. | |
| 6,407,779 B1 * | 6/2002 | Herz | H04N 21/42226 340/12.3 |
| 6,415,316 B1 | 7/2002 | Van Der Meer | |
| 6,489,886 B2 * | 12/2002 | Meier | B60R 25/24 340/425.5 |
| 6,732,158 B1 * | 5/2004 | Hesselink | H04N 5/782 348/E5.108 |
| 6,750,433 B2 | 6/2004 | Guenther et al. | |
| 6,791,467 B1 * | 9/2004 | Ben-Ze'ev | G08C 19/28 340/12.25 |
| 6,956,498 B1 * | 10/2005 | Gauthier | G08B 1/08 236/12.12 |
| 7,042,342 B2 * | 5/2006 | Luo | B60R 25/00 340/426.13 |
| 7,057,673 B1 * | 6/2006 | Weber | G08C 23/04 348/731 |
| 7,102,616 B1 | 9/2006 | Sleator | |
| 7,126,468 B2 * | 10/2006 | Arling | G08C 17/00 340/3.3 |
| 7,130,866 B2 | 10/2006 | Schaffer | |
| 7,155,305 B2 * | 12/2006 | Hayes | G05B 15/02 340/447 |
| 7,200,643 B2 * | 4/2007 | Latvakoski | G05B 19/0423 340/853.3 |
| 7,289,790 B2 * | 10/2007 | McCorkle | G01S 7/023 455/404.2 |
| 7,340,438 B2 | 3/2008 | Nordman et al. | |
| 7,370,343 B1 | 5/2008 | Ellis | |
| 7,508,354 B1 | 3/2009 | Sanders et al. | |
| 7,538,711 B2 * | 5/2009 | Chung | H04N 5/4403 340/12.22 |
| 7,583,685 B2 * | 9/2009 | Ajitomi | H04L 12/2803 370/401 |
| 7,589,642 B1 * | 9/2009 | Mui | G08C 17/00 340/12.3 |
| 7,649,456 B2 * | 1/2010 | Wakefield | G01S 5/0252 340/12.53 |
| 7,756,726 B2 | 7/2010 | Thuerk | |
| 7,945,589 B1 | 5/2011 | Weiss et al. | |
| 7,956,792 B2 * | 6/2011 | Chen | H04B 1/202 340/13.24 |
| 7,969,513 B1 * | 6/2011 | Weber | G08C 23/04 348/725 |
| 8,004,389 B1 * | 8/2011 | Mui | G08C 17/00 340/13.24 |
| 8,054,854 B2 * | 11/2011 | Poslinski | G08C 17/00 348/14.05 |
| 8,161,290 B2 * | 4/2012 | McQuaide, Jr. | H04B 1/202 713/150 |
| 8,187,005 B1 | 5/2012 | Ward | |
| 8,194,037 B2 | 6/2012 | Kerr et al. | |
| 8,198,988 B2 * | 6/2012 | Hardacker | H04L 63/0428 340/12.51 |
| 8,207,830 B2 * | 6/2012 | Rutjes | H04L 12/66 315/312 |
| 8,261,362 B2 | 9/2012 | Goodwin et al. | |
| 8,274,381 B2 * | 9/2012 | Schmehl | G08C 17/02 340/10.1 |
| 8,299,954 B2 * | 10/2012 | Friedman | H04N 5/4403 340/12.22 |
| 8,307,389 B2 | 11/2012 | Sakai et al. | |
| 8,310,348 B2 * | 11/2012 | Fang | G05B 19/042 340/12.5 |
| 8,339,246 B2 * | 12/2012 | Langer | G08B 21/24 340/12.22 |
| 8,402,011 B1 | 3/2013 | Bodenhamer | |
| 8,432,264 B1 | 4/2013 | Hsu | |
| 8,477,060 B2 * | 7/2013 | Belz | G08C 17/00 340/12.23 |
| 8,499,041 B2 | 7/2013 | Fiedorowicz et al. | |
| 8,624,713 B2 * | 1/2014 | Van Vleck | H04L 12/2809 340/12.25 |
| 8,812,629 B2 * | 8/2014 | Arling | G08C 17/02 709/220 |
| 9,076,322 B2 | 7/2015 | Patel et al. | |
| 2002/0059621 A1 | 5/2002 | Thomas et al. | |
| 2002/0067283 A1 * | 6/2002 | Marmaropoulos | G08C 17/02 340/815.69 |
| 2002/0075320 A1 | 6/2002 | Kurapati | |
| 2002/0083134 A1 | 6/2002 | Bauer et al. | |
| 2002/0130803 A1 * | 9/2002 | Conway | G08C 17/02 341/176 |
| 2002/0143805 A1 * | 10/2002 | Hayes | G06F 1/1626 345/169 |
| 2003/0076240 A1 * | 4/2003 | Bae | G05B 19/0426 340/12.5 |
| 2003/0098888 A1 | 5/2003 | Guenther et al. | |
| 2003/0193426 A1 * | 10/2003 | Vidal | G08C 17/02 341/176 |
| 2003/0218613 A1 | 11/2003 | Yamamura et al. | |
| 2004/0004603 A1 * | 1/2004 | Gerstner | G06F 1/1626 345/169 |
| 2004/0064832 A1 | 4/2004 | Tsukidate et al. | |
| 2004/0073920 A1 | 4/2004 | Yuen et al. | |
| 2004/0143847 A1 | 7/2004 | Suzuki et al. | |
| 2004/0172449 A1 * | 9/2004 | Hesselink | H04N 21/654 709/204 |
| 2004/0172662 A1 | 9/2004 | Danker et al. | |
| 2004/0203387 A1 * | 10/2004 | Grannan | G08C 17/00 455/41.2 |
| 2004/0218104 A1 | 11/2004 | Smith et al. | |
| 2004/0240451 A1 * | 12/2004 | Lee | H04L 12/2803 370/395.5 |
| 2004/0249925 A1 * | 12/2004 | Jeon | G08C 23/04 709/223 |
| 2004/0252120 A1 | 12/2004 | Hunleth et al. | |
| 2004/0266419 A1 * | 12/2004 | Arling | G08C 17/00 455/420 |
| 2005/0107586 A1 * | 5/2005 | Su | C07K 14/47 530/350 |
| 2005/0132420 A1 | 6/2005 | Howard et al. | |
| 2005/0159823 A1 | 7/2005 | Hayes et al. | |
| 2005/0172228 A1 * | 8/2005 | Kakuda | G08C 19/28 715/234 |
| 2005/0213549 A1 | 9/2005 | Bridge et al. | |
| 2006/0008256 A1 | 1/2006 | Khedouri et al. | |
| 2006/0031682 A1 | 2/2006 | Sakai et al. | |
| 2006/0033636 A1 * | 2/2006 | Kwong | G08C 17/02 340/13.25 |
| 2006/0048194 A1 * | 3/2006 | Poslinski | G08C 17/00 725/81 |
| 2006/0055554 A1 * | 3/2006 | Hayes | G08C 19/28 340/4.3 |
| 2006/0109138 A1 * | 5/2006 | Chiang | G08C 19/28 340/12.29 |
| 2006/0120726 A1 | 6/2006 | Yoshifusa et al. | |
| 2006/0125632 A1 * | 6/2006 | Luebke | H04L 12/2803 340/539.26 |
| 2006/0174277 A1 | 8/2006 | Sezan et al. | |
| 2006/0184966 A1 | 8/2006 | Hunleth et al. | |
| 2006/0267741 A1 | 11/2006 | Park et al. | |
| 2006/0270458 A1 * | 11/2006 | Watanabe | G08C 17/02 455/562.1 |
| 2006/0282851 A1 | 12/2006 | Errico et al. | |
| 2006/0294192 A1 | 12/2006 | Mao et al. | |
| 2007/0050054 A1 * | 3/2007 | Sambandam Guruparan | G08C 19/28 70/65 |
| 2007/0089069 A1 | 4/2007 | Hsieh et al. | |
| 2007/0097878 A1 * | 5/2007 | Morioka | H04W 12/06 370/254 |
| 2007/0100520 A1 | 5/2007 | Shah et al. | |
| 2007/0139569 A1 | 6/2007 | Matsubayashi | |
| 2007/0143790 A1 * | 6/2007 | Williams | H04N 5/44543 725/38 |

(56) References Cited

U.S. PATENT DOCUMENTS

| | | | |
|---|---|---|---|
| 2007/0189737 A1 | 8/2007 | Chaudhri et al. | |
| 2007/0222635 A1* | 9/2007 | Clout | G08C 17/02 340/9.1 |
| 2007/0245384 A1* | 10/2007 | Walter | H04W 88/02 725/62 |
| 2007/0260331 A1* | 11/2007 | Rouhier | G08C 17/02 700/17 |
| 2007/0296552 A1* | 12/2007 | Huang | G08C 17/02 340/10.5 |
| 2008/0022297 A1 | 1/2008 | Walter et al. | |
| 2008/0055245 A1* | 3/2008 | Migliacio | G06F 3/016 345/158 |
| 2008/0065720 A1 | 3/2008 | Brodersen et al. | |
| 2008/0066010 A1 | 3/2008 | Brodersen et al. | |
| 2008/0066094 A1 | 3/2008 | Igoe | |
| 2008/0066124 A1 | 3/2008 | Igoe et al. | |
| 2008/0079604 A1* | 4/2008 | Madonna | G01S 5/02 340/13.24 |
| 2008/0094245 A1* | 4/2008 | Hardacker | G05B 15/02 340/4.32 |
| 2008/0122870 A1 | 5/2008 | Brodersen et al. | |
| 2008/0151125 A1 | 6/2008 | Bucchieri | |
| 2008/0180228 A1* | 7/2008 | Wakefield | G01S 5/0252 340/4.62 |
| 2008/0222295 A1 | 9/2008 | Robinson et al. | |
| 2008/0244702 A1 | 10/2008 | Kropivny | |
| 2008/0252509 A1 | 10/2008 | Yokozawa | |
| 2009/0002218 A1 | 1/2009 | Rigazio et al. | |
| 2009/0003549 A1 | 1/2009 | Baird et al. | |
| 2009/0012940 A1 | 1/2009 | Ives et al. | |
| 2009/0064260 A1 | 3/2009 | O'Callaghan | |
| 2009/0115723 A1 | 5/2009 | Henty | |
| 2009/0119737 A1 | 5/2009 | Perlman et al. | |
| 2009/0141184 A1 | 6/2009 | Gulati | |
| 2009/0153289 A1 | 6/2009 | Hope et al. | |
| 2009/0154933 A1* | 6/2009 | Mortensen | G08C 23/04 398/107 |
| 2009/0216859 A1 | 8/2009 | Dolling | |
| 2009/0219174 A1* | 9/2009 | Kikuchi | H04N 5/76 341/20 |
| 2009/0220243 A1* | 9/2009 | Petricoin, Jr. | G08C 17/00 398/106 |
| 2009/0269027 A1* | 10/2009 | Bedingfield, Sr. | H04N 5/4403 386/248 |
| 2009/0284468 A1 | 11/2009 | Takaki | |
| 2009/0303097 A1* | 12/2009 | Reams | H03J 1/0025 341/176 |
| 2010/0013695 A1* | 1/2010 | Hong | G08C 17/02 341/176 |
| 2010/0017736 A1* | 1/2010 | Kim | G08C 17/02 715/771 |
| 2010/0024020 A1 | 1/2010 | Baugher et al. | |
| 2010/0028010 A1* | 2/2010 | Zhao | H04B 10/116 398/106 |
| 2010/0053458 A1 | 3/2010 | Anglin et al. | |
| 2010/0056054 A1* | 3/2010 | Yamato | H04W 52/50 455/41.2 |
| 2010/0060506 A1* | 3/2010 | Maier | G08C 17/02 341/176 |
| 2010/0064313 A1 | 3/2010 | Beyabani | |
| 2010/0070995 A1 | 3/2010 | Pan | |
| 2010/0083315 A1 | 4/2010 | White et al. | |
| 2010/0134312 A1 | 6/2010 | Park et al. | |
| 2010/0169842 A1 | 7/2010 | Migos | |
| 2010/0188334 A1 | 7/2010 | Yamamoto et al. | |
| 2010/0191799 A1 | 7/2010 | Fiedorowicz et al. | |
| 2010/0201891 A1* | 8/2010 | Laroia | G08C 17/00 348/734 |
| 2010/0208146 A1* | 8/2010 | Reams | G08C 17/02 348/734 |
| 2010/0211636 A1* | 8/2010 | Starkenburg | H04N 7/17318 709/203 |
| 2010/0235740 A1 | 9/2010 | Friedlander et al. | |
| 2010/0263003 A1 | 10/2010 | Gupta et al. | |
| 2010/0283624 A1* | 11/2010 | Krueger | G08C 17/02 340/12.29 |
| 2010/0309119 A1 | 12/2010 | Yi et al. | |
| 2010/0315261 A1* | 12/2010 | Rutjes | H04L 12/66 340/9.1 |
| 2011/0012772 A1 | 1/2011 | Chuang et al. | |
| 2011/0026765 A1 | 2/2011 | Ivanich et al. | |
| 2011/0037635 A1* | 2/2011 | Van Vleck | H04L 12/2809 341/176 |
| 2011/0037851 A1* | 2/2011 | Kim | G06F 3/04847 348/143 |
| 2011/0057771 A1* | 3/2011 | Lucaci | H04L 12/282 340/5.5 |
| 2011/0058107 A1 | 3/2011 | Sun et al. | |
| 2011/0066942 A1 | 3/2011 | Barton | |
| 2011/0083148 A1 | 4/2011 | Sakaguchi et al. | |
| 2011/0109444 A1* | 5/2011 | Edwards | G08C 19/28 340/12.23 |
| 2011/0114716 A1* | 5/2011 | Pratt | H04L 12/2814 235/375 |
| 2011/0121938 A1* | 5/2011 | Slemmer | G05B 13/028 340/3.1 |
| 2011/0128451 A1* | 6/2011 | Easterhaus | G08C 17/02 348/734 |
| 2011/0156862 A1* | 6/2011 | Langer | G08B 21/24 340/4.37 |
| 2011/0179453 A1 | 7/2011 | Poniatowski | |
| 2011/0187491 A1* | 8/2011 | Innes | G05B 19/02 340/4.3 |
| 2011/0211131 A1 | 9/2011 | Kikuchi et al. | |
| 2011/0298700 A1 | 12/2011 | Ito et al. | |
| 2012/0005536 A1* | 1/2012 | Beattie, Jr. | H04L 41/0677 714/37 |
| 2012/0042251 A1 | 2/2012 | Rodriguez | |
| 2012/0075538 A1* | 3/2012 | Okuda | G08C 17/02 348/734 |
| 2012/0119885 A1* | 5/2012 | McQuaide, Jr. | G08C 19/28 340/10.4 |
| 2012/0174164 A1 | 7/2012 | Patel et al. | |
| 2012/0324398 A1 | 12/2012 | Lee et al. | |
| 2013/0167045 A1 | 6/2013 | Xu et al. | |

FOREIGN PATENT DOCUMENTS

| | | |
|---|---|---|
| JP | H10-224872 | 8/1998 |
| JP | 2000196654 A | 7/2000 |
| JP | 2002-58079 | 2/2002 |
| JP | 2002-525942 | 8/2002 |
| JP | 2003092788 A | 3/2003 |
| JP | 2006-41584 | 2/2006 |
| JP | 2007116631 A | 5/2007 |
| WO | WO 01/75837 A2 | 10/2001 |

OTHER PUBLICATIONS

Japan Patent Office, "Notification of Reasons for Rejection" in application No. 2013-521768, dated Jan. 7, 2014, 3 pages.

European Patent Office, "Search Report" in application No. 11809983.7-1855, dated Jan. 2, 2014, 6 pages.

Current Claims in application No. 11809983.7, dated Jan. 2014, 3 pages.

Current Claims in application No. 2013-521768, dated Jan. 2014, 3 pages.

U.S. Appl. No. 13/289,388, Non-Final Office Action dated Jan. 26, 2015.

U.S. Appl. No. 12/842,966, Final Office Action dated Feb. 18, 2015.

U.S. Appl. No. 13/420,553, Notice of Allowance dated Mar. 3, 2015.

Japan Patent Office, "Decision of Rejection" in application No. 2013-521768, dated Jun. 3, 2014, 2 pages.

Current Claims in Japan application No. 2013-521768, dated Jun. 2014, 3 pages.

U.S. Appl. No. 13/289,388, Final Office Action dated Jul. 30, 2015.

Chinese Patent Office, Application No. 201180036208.3, Non-Final Office Action dated Jul. 15, 2015.

Chinese Patent Office, Application No. 201180036208.3, Pending Claims as of Jul. 15, 2015.

Japanese Patent Office, Application No. 2014-205224, Foreign Office Action dated Aug. 4, 2015.

(56) References Cited

OTHER PUBLICATIONS

Japanese Patent Office, Application No. 2014-205224, Pending Claims as of Aug. 4, 2015.
U.S. Appl. No. 13/289,388, Advisory Action dated Oct. 20, 2015.
U.S. Appl. No. 13/289,388, Non-Final Office Action dated Mar. 7, 2016.
U.S. Appl. No. 12/842,966, Non-Final Office Action dated Apr. 4, 2016.
Chinese Patent Office, Application No. 201180036208.3, Foreign Office Action dated Feb. 6, 2016.
Chinese Patent Office, Application No. 201180036208.3, Pending Claims as of Feb. 6, 2016.

* cited by examiner

US 9,424,738 B2

AUTOMATIC UPDATES TO A REMOTE CONTROL DEVICE

CROSS-REFERENCE TO RELATED APPLICATIONS; BENEFIT CLAIM

This application claims the benefit as a Continuation of application Ser. No. 12/842,966, filed Jul. 23, 2010, and is related to application Ser. No. 13/420,553 filed Mar. 14, 2012, and is related to application Ser. No. 13/289,388 filed Nov. 4, 2011, and is related to International Application No. PCT/US11/21592 with a Filing Date of Jul. 23, 2010, the entire content of all of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to a remote control device. Specifically, the invention relates to operating a target media device with a remote control device and a second media device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Remote control devices are often used for operating one or more target media devices. A remote control device communicates directly with a target media device in a uni-directional mode. The remote control device generally receives a user command from a user and transmits the user command directly to the target media device. A set of available user commands are limited to the set of user commands stored on the remote control device. The remote control device does not receive any information in addition to the received user command for identifying and/or operating a target media device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
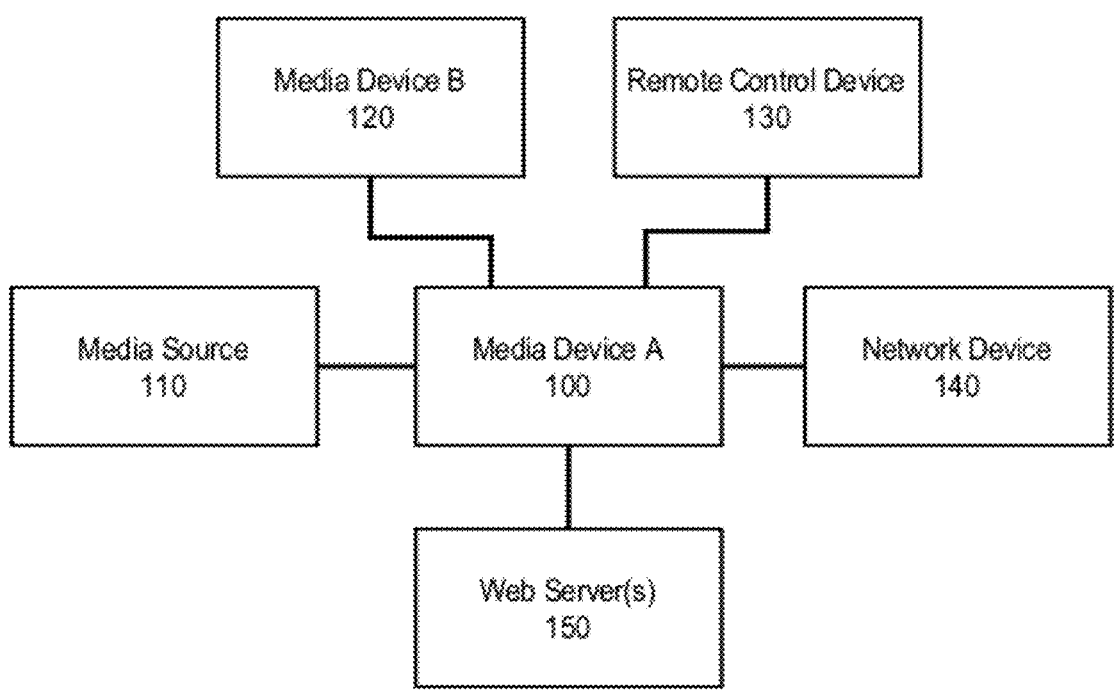
FIG. 1A is a block diagram illustrating an example system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
    2.0 SYSTEM ARCHITECTURE
    3.0 REMOTE CONTROL DEVICE
    4.0 PROVIDING INPUT VIA MOVEMENTS OF THE REMOTE CONTROL DEVICE
    5.0 SPLIT CONTROLS
    6.0 UPDATES
    7.0 PRIVACY LEVEL
    8.0 AUTOMATIC INTERACTIVITY MODE
    9.0 CUSTOM REMOTE CONFIGURATION
    10.0 UNI-DIRECTIONAL COMMUNICATION MODE
    11.0 BI-DIRECTIONAL COMMUNICATION MODE
    12.0 HARDWARE OVERVIEW
    13.0 EXTENSIONS AND ALTERNATIVES

1.0 Functional Overview

In an embodiment, a method for operating a target media device includes receiving a user command by a remote control device for operating a target media device, where a signal to operate the target media device is not stored on the remote control device when the user command is received. Data associated with the user command is transmitted by the remote control device to a second media device and signal information, associated with the signal to operate the target media device, is received by the remote control device from the second media device. The signal to operate the target media device is transmitted by the remote control device to the target media device, where the target media device performs a function based on the signal received from the remote control device.

The signal transmitted by the remote control device to the target media device may include an infrared signal or a radio signal (such as a 2.4 GHz or 900 MHz signal). Transmitting the information associated with the user command by the remote control device to a second media device may include transmitting signal using Bluetooth, HDMI CEC, Ethernet or Wi-Fi.

In an embodiment, the remote control device may identify the target media device for transmitting the signal based on the signal information received from the second media device. The remote control device may identify the target media device for transmitting the signal based on a previous signal transmitted to the target media device.

In an embodiment, a method for operating a target media device includes receiving a user command by a remote control device for operating a target media device, and the remote control device transmitting data associated with the user command to a second media device. The method further includes the second media device transmitting a signal, based on the user command, to the target media device, where the target media device performs a function based on the signal received from the second media device.

In an embodiment, the remote control device transmitting data to the second media device includes transmitting a Bluetooth signal. The second media device transmitting the signal to operate the target media device includes the second the media device transmitting an infrared signal.

In an embodiment, the remote control device is not configured for direct communication with the target media device.

In an embodiment, a method includes displaying a menu selection comprising a first set of choices on a display screen and detecting a movement of the remote control device. In response to detecting the movement of the remote control device, modifying the menu selection to display a second set of choices.

The movement of the remote control device may include an acceleration pattern of the remote control device. The acceleration pattern may include one or more of: an acceleration direction or an acceleration speed.

Although specific components are recited herein as performing the method steps, in other embodiments agents or mechanisms acting on behalf of the components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

2.0 System Architecture

Although a specific computer architecture is described herein, other embodiments of the invention are applicable to any architecture that can be used to perform the functions described herein.

FIG. 1 shows a media device A (100), a media source (110), a media device B (120), a remote control device (130), a network device (140), and a web server (150). Each of these components are presented to clarify the functionalities described herein and may not be necessary to implement the invention. Furthermore, components not shown in FIG. 1 may also be used to perform the functionalities described herein. Functionalities described as performed by one component may instead be performed by another component.

In an embodiment, the media source (110) generally represents any content source from which the media device A (100) (or media device B (120)) can receive media content. The media source (110) may be a broadcaster (includes a broadcasting company/service) that streams media content to media device A (100). The media source (110) may be a media content server from which the media device A (100) downloads the media content. The terms streaming, broadcasting, or downloading to a device may be used interchangeably herein and should not be construed as limiting to one particular method of the device obtaining data. The media device A (100) may receive data by streaming, broadcasting, downloading, etc. from a broadcast service, a web server, another media device, or any suitable system with data or content that may be accessible by the media device. Different sources may be mentioned as different examples presented below. An example describing a specific source should not be construed as limited to that source.

In an embodiment, the network device (140) generally represents any component that is a part of the media device A (100) or a separate device altogether that includes functionality to communicate over a network (e.g., internet, intranet, world wide web, etc.). For example, the network device (140) may be a computer communicatively coupled with media device A (100) or a network card in the media device A (100). The network device (140) may include functionality to obtain content from over a network. For example, the network device (140) may be configured to obtain a list of available content or the available content itself. The network device (140) may be configured to obtain remote control codes/signal information for operating a media device (e.g., media device B (120)). For example, the network device (140) may be used to query a database with information identifying media device B (120) and in response, receiving control signals for remotely controlling media device B (120). The network device (140) may be configured to obtain information associated with a specific waveform protocol.

In an embodiment, a media device (e.g., media device A (100) or media device B (120)) generally represents any media device comprising a processor and configured for the input and/or output of media content. A media device may generally represent a management device that communicates with one or more other media devices and/or remote control devices. A media device, as used herein, may refer to a single device or any combination of devices (e.g., a receiver and a television set) that may be configured to present media content. Examples of media devices include one or more of: receivers, digital video recorders, digital video players, set-top boxes, televisions, monitors, Blu-ray players, audio content players, video content players, digital picture frames, hand-held mobile devices, computers, printers, etc. The media devices (e.g., media device A (100)) may present media content by playing the media content (e.g., audio and/or visual media content), displaying the media content (e.g., still images), printing the media content (e.g., coupons), electronically transmitting the media content (e.g., electronic mail), publishing the media content (e.g., on a website), or by any other suitable means.

In an embodiment, media device A (100) may be a management device which communicates with one or more other media devices (e.g., media device B (120)) or remote control device(s) (130) in a system. For example, the media device A (100) may receive a multimedia signal for display from media device B (120) (e.g., a video player, an audio player, a multimedia player, or any other device which includes or reads memory with media content stored thereon). In an embodiment, the media device A (100) may receive a command from a remote control device (130) to operate media device B (120). The media device A (100) may then transmit a signal to media device B (120) based on the command received from the remote control device (130). In an embodiment, the media device A (100) may be configured to provide signal information to the remote control device (130) to operate other media devices (e.g., media device B (120)). In an embodiment, the media device A (100) may be context aware. For example, the media device A (100) may receive a generic command to "pause" from the remote control device (130) while a DVD is being played that is being read by media device B (120). In response to receiving the command while input from media device B (120) is being played, the media device A (100) may automatically determine that the command "pause" is applicable to the playing of the DVD by media device B (120). In an embodiment, media device A (100) may include a display or may be communicatively coupled to a display configured for presenting media content. In an embodiment, media device A (100) may include functionality to communicate via wired or wireless segments with any of the other components described herein. The media device A (100) may communicate wirelessly over one or more of: radio waves (e.g., wi-fi signal, Bluetooth signal), infrared waves, or over any other suitable frequency in the electro-magnetic spectrum. The media device A (100) may communicate over the Ethernet or using a wired connection (e.g., HDMI cables). In an embodiment, the media device A (100) may represent any apparatus with one or more subsystems configured to perform the functions described herein.

3.0 The Remote Control Device

Figure 1B:
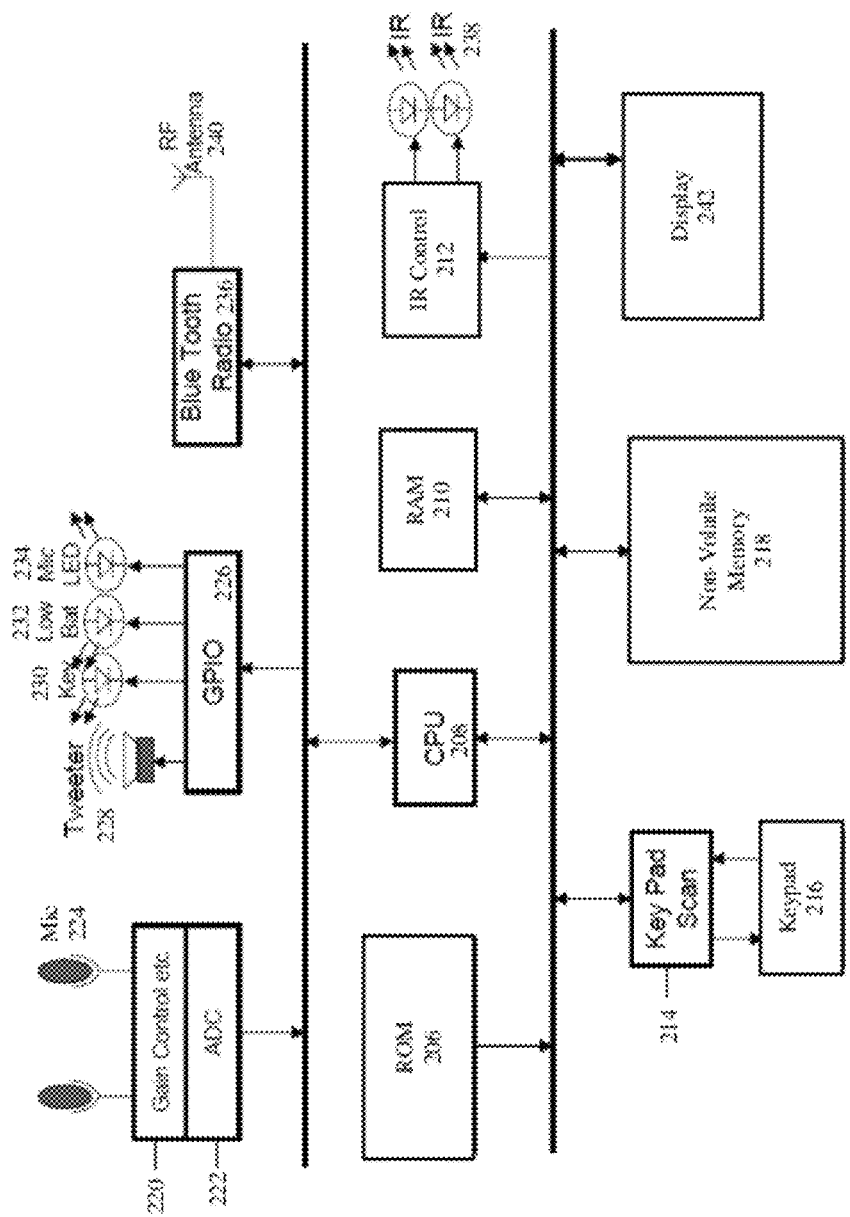
FIG. 1B is a block diagram illustrating an example remote media device in accordance with one or more embodiments.

In an embodiment, the remote control device (130) generally represents any device with a user interface to receive user commands for operating at least one media device (e.g., media device A (100) or media device B (130)). As shown in FIG. 1B, the remote control device (130) may include hardware and/or software to perform the functions described herein. Each of the components shown in FIG. 1B may not be necessary to implement one or more embodiments, described herein. Furthermore, components not shown in FIG. 1B may be used to perform functionality described herein.

The remote control device (130) may be communicatively coupled to one or more media devices through wired and/or wireless segments. The remote control device (130) may communicate wirelessly over one or more of: radio waves (e.g., wi-fi signal, Bluetooth signal), infrared waves, over any other suitable frequency in the electro-magnetic spectrum, over a network connection (e.g., intranet, internet, etc.), or through any other suitable method.

In an embodiment, the remote control device (130) may include Read Only Memory (ROM) (206), a Central Processing Unit (CPU) (208), Random Access Memory (RAM) (210), Infrared Control Unit (212), a key pad scan (214), a key pad (216), Non-Volatile Memory (NVM) (218), one or more microphones (224), gain control logic (220), analog to digital convertor (ADC) (222), a general purpose input/output (GPIO) interface (226), a speaker/tweeter (228), a key transmitter/indicator (230), a low battery indicator (or output signal) (232), a microphone LED (234), a Bluetooth radio (236), an Infrared (IR) blaster (238), a Radio Frequency (RF) Antenna (240), a QWERTY sliding keyboard (not shown), ambient noise cancellation device (not shown), etc. The remote control device (130) may additionally include any of: a Wi-Fi radio, touchpad, trackball, accelerometer, camera, light sensor, or proximity sensor. Memory on the remote control device (130) (e.g., ROM (206), RAM (210), or NVM (218)) may include control codes and/or key codes for one or more media devices (e.g., media device A (100) or media device B (120)). The memory may include a Run-Length-Limited (RLL) waveform table or other commands which may be in a compressed or uncompressed form.

In an embodiment, the low battery indicator (232) may correspond to a visual indication (e.g., an LED light) on the remote control device (130) for a low battery level. In an embodiment, the low battery indicator (232) may represent a signal output for display on a screen other than on the remote control device (130). In an embodiment, the low battery code is sent with a standard command. For example, when a channel selection is made on the remote control device (130), the command for the channel selection device is piggy backed with a low battery signal for display on a display screen. A media device that receives the signal may decode the signal into the low battery code and the command. The media device can then use the low battery code, e.g., via a lookup table for a corresponding display message or other method, to create a low battery display message to be displayed on the display screen. The low battery indicator (232) may be configured to indicate a low battery signal at periodic or non-periodic time intervals. The low battery indicator (232) may be configured to indicate a low battery signal after the battery drops below or rises above some threshold, independent of other events.

In an embodiment, a microphone (224) may be located anywhere on the remote control device (130) (e.g., one or more microphones (224) may be located at the end, or possibly opposing ends, of a remote control device (130)). If multiple microphones are available and turned on, the multiple microphones may be used to obtain user input. In an embodiment, one of the multiple microphones may be used for noise cancellation/optimization manipulations. A single audio stream may be determined from multiple input audio streams by the remote control device (130) or by a media device which receives the multiple audio streams from the remote control device (130). In an embodiment, one or more microphones may be used to capture stereo or multiphonic audio input.

In an embodiment, the remote control device (130) may include a proximity sensor (not shown) to detect presence of a user within a range of the remote control device (130) even before the user presses a button on the remote control device (130). For example, the remote control device (130) may operate in a low power state until a user is detected. Once a user is detected, the remote control device (130) may operate in a normal power state or a high power state. The remote control device (130) may be configured to turn on keypad lights as soon as a user is detected. In an embodiment, the proximity sensor may be based on capacitive coupling to detect a user near the remote control device (130). In an embodiment, the remote control device (130) includes one or more displays (242). The displays may be touch screen displays that include functionality to receive user input by a user touching the display screen. In an embodiment, a motion sensor (e.g., a simple motion sensor or an accelerometer) may be used to provide the above functionality. For example, once a user picking up the remote control device (130) is detected by the accelerometer, other features of the remote control device (130) may be activated (or powered on).

4.0 Providing Input Via Movements of the Remote Control Device

In an embodiment, the remote control device (130) may include any software and/or hardware that allows for detection of movements (e.g. "gestures" or "shakes") of the remote control device (130). For example, the remote control device (130) may include a motion sensor (e.g., a simple motion sensor to detect any movement or an accelerometer to detect specific types of movements). The motion sensor may include a micro electro-mechanical system including a cantilever beam with a proof mass. The movement of the mass from a neutral position may be used to detect the acceleration, speed, and/or direction of the movement of the remote control device (130). The motion sensor may detect acceleration with respect to three different axes. The motion sensor may be self-calibrating, pre-calibrated, or may include functionality to be calibrated by a user.

In an embodiment, the detected movements may include movement of the remote control device (130) in a particular direction (e.g., up and down, left and right, etc.), a rotation of the remote control device (130), a particular direction and/or magnitude of acceleration of the movement of the remote control device (130), a particular speed threshold of the movement of the remote control device (130), an orientation during movement, or any other detectable movement. The movements also include shocks and/or vibrations. The movement may include one or more combinations of different detectable movements. For example, detecting a movement may include detecting a sequence of left to right and right to left movements where each movement meets a threshold acceleration value for at least a portion of the movement (e.g., 20%, 50%, 95%, etc.). In an embodiment, the user may select the movements corresponding to a command out of a set of detectable movements.

In an embodiment, one or more movements of the remote control device (130) may correspond to a particular command. Accordingly, a user may be able to submit commands to operate one or more media devices by performing the movement on the remote control device (130) corresponding to the intended command.

In an embodiment, one or more movements of the remote control device (130) may correspond to a command for displaying menu choices by a media device (e.g., media device A (100) or media device B (120)). For example, one or more movements may correspond to a command for shuffling menu choices displayed on a screen. The menu choices may correspond to a choice between multimedia content available for playing (e.g., video and/or sound files). The movement may cause the available choices to be shuffled at random (e.g., new sequence of choices or new choices altogether). The movement may cause selection of a new set of choices based on user information (e.g., user preferences, user history, etc.). The movement may correspond to a command for displaying media content that is similar to the media content currently being displayed. For example, if a user shakes the remote control device (130) while watching a particular television program, media device A (100) may start playing a different television program that is similar to the particular television program being watched. In an embodiment, each shake of the remote control device (130) may result in display of a new set of menu options that are mutually exclusive from the previously displayed menu options or choices.

In an embodiment, content (e.g., audio content, video content, one or more still images, etc.) may be presented (e.g., displayed, played, etc.). In response to the detection of a movement of a remote control device, different content may be presented. The different content may be in the same category as the first presented content. For example, the content presented before the detection of a movement and the content presented after the detection of the movement may both be associated with the same genre, same singer, same actors, same producers, same photographer, same author, etc.

5.0 Split Controls

In an embodiment, the interface of the remote control device (130) may be split between physical buttons on the remote control device (130) itself and selectable buttons displayed on a screen. For example, eighty percent of the remote functionality may be accessible by pressing physical buttons on the remote control device (130) itself. The other twenty percent functionality of the remote control may be displayed on a display screen (on a separate display device) that can be navigated and/or selected using the remote control device (130) (e.g., using arrow buttons on the remote control device to select particular buttons displayed on a display screen). A button on the remote control device (130) may be used to display and access the additional functionality of the remote control on a display screen that is separate from the remote control. For example, a "more" button on the remote control may cause the display of additional choices or menu selections on the display screen.

In an embodiment, a menu may have multiple command levels. For example, on a first command level options such as settings, channels, and recordings may be available. Once an option (e.g., settings) is selected, the sub-options under the selected option are displayed. Physical buttons on the remote control device (130) may be used to operate or select the choices on the current level. Furthermore, a "more" (or other similar button) may provide additional choices from the current level on the display screen. Any number of choices on any particular level may be distributed between physical buttons on the remote control device (130) and on screen choices (e.g., buttons, radio boxes, text input, any other form of input, etc.).

The remote control device (130) may include track balls, buttons, keypads, optical sensors, or any other suitable interface components which may be used to display and access the additional functionality of the remote control on a display screen.

6.0 Updates

In an embodiment, the remote control device (130) may be automatically updated based on a set of media devices being used in the system. The automatic update of the remote control device may be based on any change in a system configuration including, but not limited to, addition of media devices in the system, removal of media devices, hardware or software changes within the media devices, firmware updates, etc. For example, when a new media device is plugged into a system of devices or when a new media device is communicatively coupled with one or more devices in a set of devices, the remote operating codes for the new media device may be automatically sent to the remote control device (130), e.g., via Bluetooth, via RF, via USB or wireless to a docking device for the remote control, etc. In an embodiment, a particular media device may maintain state information of all devices plugged into the system (or in an on state) that are accessible for input/output. The particular media device may then push updates with operating codes onto the remote control device (130) based on the devices that are plugged into the system or communicatively coupled to one or more devices in the system. In an embodiment, the media device may push firmware updates onto the remote control device (130). In another embodiment, the remote control device (130) may be configured to periodically pull remote operating codes (130) for any new devices that have been plugged in or otherwise communicatively coupled to the system of devices.

In an embodiment, software updates or firmware updates to a media device (100) may result in new or modified menu options, new or modified configurations, or other changes associated with the media device (100). The changes associated with the media device (100) may be automatically loaded onto the remote control device (130) (e.g., using push and/or pull methodologies). For example, interface components for selecting new options or features associated with the media device may be automatically added to a touch screen menu displayed on the remote control device (130). In another example, physical buttons on the remote control device (130) that were previously configured to operate some features may be re-configured to operate the new features associated with a newly added media device. A menu or interface stored on a new media device that is communicatively coupled to a system may be automatically detected and transmitted to a remote control device (130) for display on the remote control device (130).

In an embodiment, any change in a system configuration (e.g., changes to hardware and/or software, addition/removal of components within a system) may be detected. In response to detecting the changes in the system, remote control operations associated with the change (e.g., new features, new devices, removal of features, removal of devices, changes in features, etc.) may be identified. Remote control operations may include any operation associated with one or more devices which may be performed using a remote control device (130). Examples of remote control operations may include turning a device on or off, selecting media content for displaying or playing, selecting input devices, recording content, uploading content to a web server, downloading content, etc. A remote control device may be automatically updated based on the identified remote control operations. For example, when a new device is communicatively coupled (e.g., through wired or wireless segments) to a system (or set of devices), remote control operations for operating the new device may be identified. The remote control device may then be updated by changes to existing menus or addition of menus that allow a user to submit input for selecting one or more of the remote control operations associated with the new device. In an embodiment, a newly added device may communicate with the remote control device via an intermediate device. For example, a management device may detect that a new device was communicatively coupled to one or more devices within a set of devices. The management device may then obtain information associated with the new device (e.g., directly from the new device, through a database query, etc.) and identify remote control operations for operating the new device with a remote control device. The management device may then update the remote control device with functionality to perform the remote control operation for operating the new device. The signals for performing the remote control operations may then be sent by the remote control device directly to the new device or may be sent to an intermediate device which sends a signal to the new device to perform the remote control operation.

In an embodiment, the remote control device (130) may be configured to automatically recognize devices within a particular range and change mode to operate the recognized device. For example, a remote control device (130) being used to operate a first media device in a first room may be carried by a user to a second room with a second media device. The remote control device (130) may determine that the second media device is within a particular range and automatically initiate communication with the second media device. For example, any command entered on the remote control device (130) while the remote control device (130) is in the second room may operate the second media device. Any command entered on the remote control device (130) while the remote control device (130) is in the first room may operate the first media device. In an embodiment, the automatic change from the remote control device (130) operating the first media device to the remote control device (130) operating the second media device may be performed by the media devices. For example, the second media device may sense the remote control device (130) (e.g., via Bluetooth) and reconfigure the remote control device (130) to operate the second media device. If the remote control device (130) is within range of the first media device, the first media device may reconfigure the remote control device (130) to operate the first media device. In an embodiment, a media device that senses the remote control device (130) may reconfigure the remote control device (130) to operate that media device or any other media device that can receive commands from the remote control device (130).

7.0 Privacy Level

In an embodiment, the remote control device (130), media device (100), display screen, or any component within a system may indicate a privacy level of the multimedia content being watched. A privacy level associated with media content may be a configurable setting which indicates whether information associated with a user's viewing and/or recording of the multimedia content may be published. The information may include whether the user has viewed and/or recorded, the multimedia content, when the user has viewed and/or recorded the multimedia content, a user's rating of the multimedia content, a user's recommendation of the multimedia content, etc. The privacy level may indicate if the information may be published, to who the information may be published, when the information may be published, where the information may be published, and/or when the information may be published. For example, the privacy level may indicate that viewing/recording of a particular media content is public information available for publication to all users, available for publication to a particular set of users (e.g., friends, co-workers, family, etc.), or available for publication to nobody. The privacy level may identify a web site (e.g., a social networking website or a personal web page) that may be used for publication of the information.

In an embodiment, the privacy level may be configured by a user using a remote control device or entering input directly to a media device (e.g., digital video recorded, cable box, personal computer, television, smart phone, a hand-held device, etc.) The user may select the privacy level for multimedia content prior to watching/recording the media content, concurrently with watching/recording the media content, and/or subsequent to watching/recording the media content. In an embodiment, the privacy level may be selectable using a one-touch button on the remote control device (130). For example, the remote control device (130) may include a set of two or more buttons where pressing a button while watching or recording a particular show applies the privacy level corresponding to the button to the particular show. In an embodiment, the privacy level may be selected by audio input. For example, a user may submit audio input "private," while watching multimedia content, to a microphone on the remote control device (130). The remote control device may then transmit a signal to a media device in the set of media devices indicating that viewing of the multimedia content by the user is not to be published. If the term "private" is configured for publication to a limited group of people or in a limited manner (e.g., only a particular web page), the remote control device (130) may transmit a signal to a media device indicating that viewing of the multimedia content is to be published to the limited group of people or in the limited manner.

In an embodiment, the privacy level may be automatically activated based on content. For example, any media content rated X or not rated (NR) may be automatically set as private content that is not to be published. In an embodiment, content may be digitally analyzed (e.g., using fingerprints) to identify content characteristics (e.g., nudity, profanity, etc.) and the privacy level may be selected based on the detected characteristics. A setting or configuration set by a user may accordingly prevent publication of any information associated with media content that includes a particular content type (e.g., nudity, profanity, etc.). In an embodiment, the privacy level may be based on the particular user in a household. For example, when a first user is watching and/or recording multimedia content, the publication of information associated with the first user's viewing and/or recording of the multimedia content may be automatically prevented. When a second user is watching and/or recording multimedia content, the information associated with the second user's watching and/or recording of the multimedia content may be automatically published.

In an embodiment, the user as used herein may refer to an individual, a group of individuals, a household (e.g., "the Taylor household"), a corporation, or any other entity. The user may be identified based on a registration associated with a media device or a billing associated with the media device. For example, the user may be identified based on a cable bill. In another example, a user may be prompted to log in prior to watching the multimedia content or during a display of the multimedia content which would identify the user. A user may be identified based on voice, fingerprints (e.g., on a remote control device), or using any other identification means.

Publishing information may include, for example, posting the information on a web page (e.g., social networking web page associated with a user), emailing or otherwise communicating the information to one or more other users, using the information for recommending the media content to other users, etc. Publishing the information may include any distribution or presentation of information that indicates that the user has recorded and/or viewed the multimedia content. In an embodiment, publication of the information may be controlled by the media device or by an external receiving entity. For example, a publication filter to filter out information associated with viewing content that is not to be published may be applied by a media device and the remaining information may be sent to a web server (or other publishing entity) or publication. In another example, all information regarding the viewing of content may be sent to a web server (or other publishing entity) and a selection of which information to publish or not publish may be made by the publishing entity based on the privacy level. In an embodiment, a user may select the privacy level on a social networking web page associated with a web service which is configured to receive all information regarding the user's viewing of content. The web service may then filter the content based on the user's selected privacy level.

In an embodiment, a visual indicator of the privacy level for a particular multimedia content may be concurrently displayed with displaying of the multimedia content. For example, multimedia content may be displayed in response to a command for viewing the multimedia content. Furthermore, a selection of the privacy level for the multimedia content may be received where the privacy level indicates whether a user's viewing of the multimedia content may be published. In response to the receiving the selection of the privacy level, a visual indicator may be displayed concurrently with displaying of the multimedia content which indicates the privacy level. In an embodiment, the remote control device (130) may indicate the privacy level of the content being recorded or displayed. For example, the privacy level indication may be a visual indication (e.g., a different colored light emitting diode (LED) indicating different privacy levels) and/or an audio indication (e.g., the remote control indicating the privacy level by sound). In an embodiment, a screen (e.g., on the remote control device, on a television, or any other suitable device) may indicate the privacy level of the multimedia content being displayed, being recorded, or being scheduled for a recording. For example, an icon overlaid on the multimedia content being displayed may indicate the privacy level associated with that multimedia content. In an embodiment, a separate light may be emitted on the side or top of a display device to indicate the privacy level associated with the multimedia content that is being displayed or recorded. In an embodiment, the visual indicator of the privacy level may be displayed or played (e.g., sound) in response to a user command. For example, a user may check the current privacy level by submitting input on a remote control device (or any media device) and in response, the privacy level may be presented by audio and/or visual means.

8.0 Automatic Interactivity Mode

In an embodiment, the remote control device or a media device (e.g. a digital video recorder) may be configured to automatically interact with one or more components that are within a communications range of the remote control device or the media device. For example, the media device may automatically detect one or more devices that are within Bluetooth range of the media device. For example, the media device may automatically detect one or more remote control devices that are within Bluetooth range of the media device. Upon detection of a remote control device within communications range, the media device may automatically initiate communication with the remote control device and send information to configure the remote control device to display options associated with the media device. For example, the remote control device may display a menu received from the media device in order for the user to interact or otherwise control the media device.

In an embodiment, as a user holding a remote control walks from a first room in a house to a second room in the house, the remote control device automatically switches from communication with the devices in the first room in the house to communication with the devices in the second room in the house. A media device in a second room may initiate a communication pathway with the remote control in response to detecting that the remote control is within communication range or within another range (e.g., distance from the media device). Accordingly, a user is able to hold on to a single remote control device and provide input commands to different devices at different locations. The remote control may be configured to automatically switch to any number of devices at any number of locations. For example, a remote control device that is implemented as part of a cellular telephone may be carried by a particular user from home, to car, to work, etc. As the user goes from location to location with the cellular telephone, the cellular telephone may automatically establish communication channels with the available devices and accordingly, allow a user to operate the available devices. In an embodiment, the remote control device may be configured to automatically connect to devices within a range or to devices that have the closest proximity to the remote control.

In an embodiment, the remote control device may display content that is specific to a particular device. For example, as the remote control device switches between different devices, the remote control device may display menus or user interfaces that are specific to the current device.

9.0 Custom Remote Configuration

In an embodiment, a remote control may be dynamically customized based on a user (or operator) of the remote. The user may be identified using any input means associated with the remote control device. For example, the remote control device may include an optical sensor configured for reading user fingerprints. The user may be identified based on a fingerprint by the remote control itself or by a media device communicatively coupled to the remote control. In an embodiment, the user may be identified based on a specific button or combination of buttons selected by the user (e.g., a user code), or a particular drawing/pattern entered by the user. The user may log in to the system using the remote control device. The user may be recognized based on audio input (e.g., voice command or generic conservation) received by a microphone. The user may be identified based on a particular motion of a remote control device (e.g., using an accelerometer).

Based on the identified user, a user interface displayed on the remote control device may be adapted to user preferences, settings, etc. For example, buttons on the user interface may be selected and displayed based on user preferences. In another example, light settings or audio settings associated with the remote control device may be selected based on the identified user. In an embodiment, content displayed or content available may be determined based on the identified user. For example, a user identified using the remote control device may have recorded particular shows. When the user is identified a recorded show menu may include the shows recorded by that particular user while filtering out shows recorded by other users. In an embodiment, parental controls may be implemented based on the recognized user. For example, identification of an adult user may result in displaying a menu which includes adult content, whereas identification of a child user may result in displaying a menu which filters out adult content. In an embodiment, system settings (e.g., speakers, light, etc.) may be adjusted based on the identified user. For example, in response to detecting a senior user, the volume may be raised. In an embodiment, gaming settings may be selected based on the identified users. For example, particular consoles may be turned on or off based on the identified user, particular games may be selected based on the identified user, particular network settings, or buddy lists may be setup based on the identified user.

In one example, a user may pick up a remote control device which then identifies the user. A particular gaming console may then be turned on or selected for input/output based on the identified user. Furthermore, in a networked game, the gaming console may automatically enter an environment that includes friends or groups associated with the identified user. An interactive environment may be entered in response to a remote control device automatically identifying the user.

10.0 Uni-Directional Communication Mode

Figure 2:
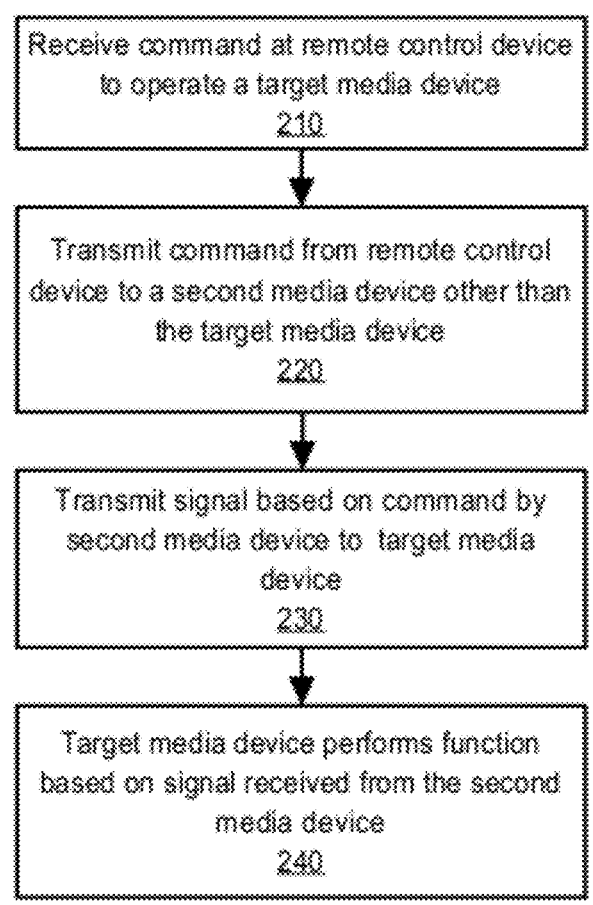
FIGS. 2 and 3 illustrate flow diagrams for operating a target media device in accordance with one or more embodiments.

FIG. 2 illustrates a flow diagram for operating the remote control device in a uni-directional communication mode, in accordance with an embodiment. One or more of the steps described below may be omitted, repeated, and/or performed in a different order. Accordingly, the specific arrangement of steps shown in FIG. 2 should not be construed as limiting the scope of the invention.

Initially, a command is received at the remote control device from a user for operating a target media device (Step 210). The command may be received by detecting a movement of the remote control. The command may be received by a user entering a command on a keypad, keyboard, touch screen, joystick, or other interface component on the remote control device. The command may be a selection in the electronic programming guide (EPG) by a user for the recording and/or playing of the media content. The command may be a channel selection entered by a user. The command may be a request to display a slide show of pictures. The command may be to play an audio file. The command may be a request to play a movie (e.g., a command for a blu-ray player). In an embodiment, receiving the command to present media content may include a user entering the title of media content in a search field on a user interface.

In an embodiment, the command may be received with an explicit identification of the media device for which the command is received. For example, a DVD player mode may first be selected on the remote control device and then a command to play a DVD may be submitted. In an embodiment, the command may be received without an explicit identification of the media device for which the command is received. For example, a generic command to "pause" may be received without identification of a particular media device to which the command is applicable. In an embodiment, no information about the target media device is available to the remote control device. Based on the context (e.g., current playing of a DVD), the command may be interpreted to identify the target media device (e.g., the DVD player reading the DVD) for which the command was received. In an embodiment, the remote control device never identifies the target media device.

In an embodiment, the command received at the remote control device is transmitted from the remote control device to a second media device other than the target media device, in accordance with one or more embodiments (Step 220). The command may be transmitted to the second media device based on execution of a sequence of instructions stored on the remote control device. Execution of the sequence of instructions may also result in transmitting any command received by the remote control device to the second media device, regardless of the target media device corresponding to the command. The command may be transmitted to the second media device in response to detecting a particular set of commands that are to be transmitted to the second media device regardless of the target media device. The command may be transmitted to the second media device in response to determining that the remote control device does not have signal information for transmitting the command to the target media device. For example, the remote control device may not have codes necessary to transmit the signal to the target media device or may not have information identifying the target media device. In an embodiment, the remote control device may transmit the command (or information identifying the command) to the second media device using wired or wireless segments. For example, the remote control device may transmit the command to the second media device over Bluetooth.

In an embodiment, the second media device transmits a signal, associated with the command, to the target media device (Step 230). The second media device may determine the signal by first identifying the target media device. The second media device may identify the target media device based on information received from the remote control device that explicitly identifies the target media device. The second media device may identify the target media device based on context. For example, if a command for pause is received by the second media device from the remote control device during playing of a DVD by a DVD player, then the DVD player may be identified as the target media device. Another example may involve receiving a command while an interface is being displayed. A particular media device associated with the interface being displayed may be automatically identified as the target media device. In an embodiment, the second media device may identify the target media device based on one or more previous commands received from the remote control device. For example, previous commands may identify the target media device or be determined to operate the target media device. Based on the previous commands, a current command may be determined to correspond to a particular device, e.g., the target media device.

In an embodiment, once the target media device is identified, the second media device may transmit a signal through wired and/or wireless segments to the target media device for operation of the target media device based on the command received from the remote control device. If wireless segments are used, the second media device may transmit the signal at the same frequency or a different frequency in the electromagnetic spectrum than the frequency at which the command was received from the remote control device. For example, the command from the remote control device may be received via Bluetooth and the signal from the second media device to the target media device may be sent via infrared waves. In an embodiment, the second media device may transmit the signal over an internet protocol (IP) connection (e.g., intranet, or internet). In an embodiment, one or more intermediate devices between the second media device and the target media device may be used.

In an embodiment, the target media device performs a function based on the signal received from the second media device (Step 240). For example, the target media device may perform a particular playback function (e.g., play, stop, rewind, fast-forward, pause, etc.) based on the signal received from the second media device. If the target media device is a set-top box, the target media device may select media content for viewing and/or recording based on the signal received from the second media device. In an embodiment, the target media device may publish information associated with the viewing and/or recording of media content. For example, the target media device may publish a user viewing history on a social networking website.

11.0 Bi-Directional Communication Mode

Figure 3:
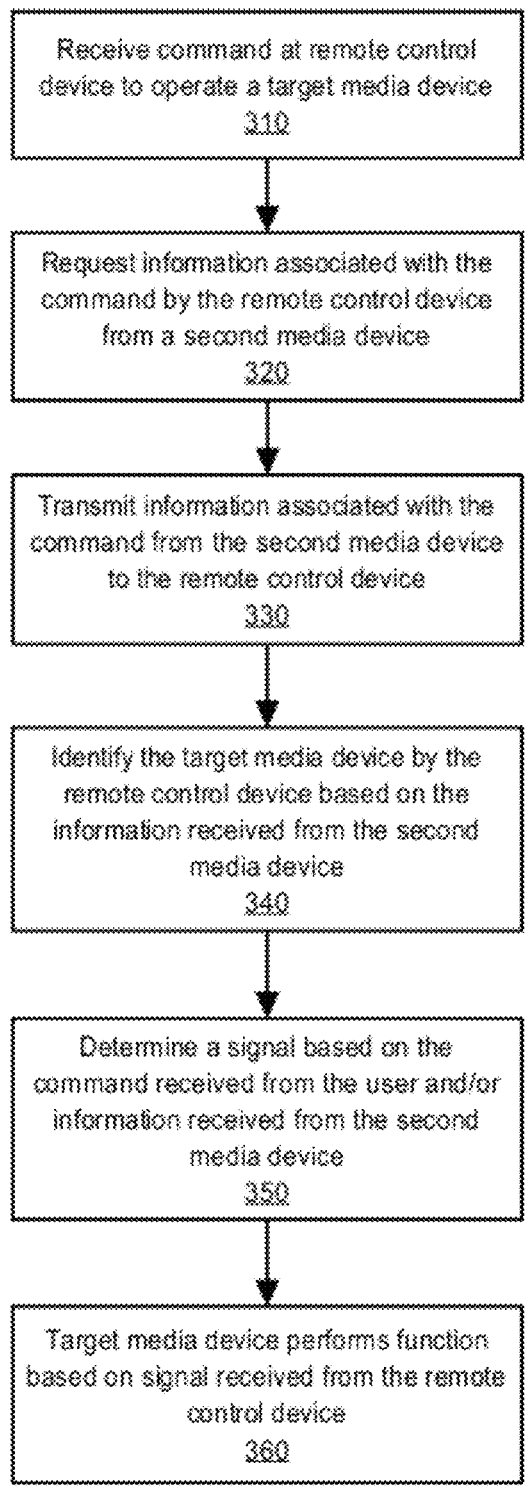

FIG. 3 illustrates a flow diagram for operating the remote control device in a bi-directional communication mode, in accordance with an embodiment. The remote control device may provide data to one or more media devices and receive data from one or more media devices. One or more of the steps described below may be omitted, repeated, and/or performed in a different order. Accordingly, the specific arrangement of steps shown in FIG. 3 should not be construed as limiting the scope of the invention.

In an embodiment, a command is received at the remote control device from a user for operating a target media device (Step 310). Step 310 is essentially the same as Step 210 described above.

In an embodiment, the remote control device requests information associated with the command from a second media device (Step 320). The remote control device may request information about the command itself. For example, the remote control device may request the actual signal, from the second media device, corresponding to the command for transmission to the target media device. The remote control device may request a portion of the actual signal from the second media device. For example, the remote control device may request only a device code for the target media device or other identification of the target media device to use in a signal (e.g., an infrared signal) to send to the target media device.

In an embodiment, the remote control device may simply send information associated with the command received to the second media device without requesting any information. The second media device may then determine whether to communicate directly with the target media device or to send information to the remote control device for communication with the target media device.

In an embodiment, the second media device may transmit information associated with the command to the remote control device (Step 330). The second media device may transmit any of the information, as described in Step 320. The information may or may not be requested by the remote control device. For example, the second media device may transmit a code of the target media device or the actual signal for the remote control device to transmit to the target media device. The second media device may also transmit the method in which the remote control device is to communicate with the target media device, e.g., via Bluetooth, IR, RF, etc. In an embodiment, the second media device may transmit any of the information, described above, without receiving a specific request for the information. For example, the second media device may periodically update the remote control device with state information. In an embodiment, the second media device may maintain state information about the system or the target media device. Examples of state information include the current display information such as interfaces displayed, selections displayed to a user, media content being played, media device providing input to the current display, etc. State information may include current configuration settings such as volume, brightness, tint, color, user preferences, etc. State information may include media device information such recordings stored on media devices, recording schedules, viewing/recording history, etc. Based on the state information, the second media device may communicate directly with a target media device based on the command received at the remote control device or the second media device may transmit information to the remote control device for communicating with the target media device.

In an embodiment, the second media device may provide information to the remote control device in response to detecting a low usage level of the remote control device or the second media device. For example, a number of processor operations over a period of time may be monitored to determine a usage level and thereafter once a threshold level indicative of low usage is detected, the second media device may transmit state information updates to the remote control device.

In an embodiment, the remote control device may not have enough information to identify the target media device when the command is first received from the user. Based on the information received from the second media device, the remote control device may identify the target media device (Step 340). The information received from the second media device may explicitly identify the target media device. The remote control device may identify the target media device based on the state information, described below, received from the second media device.

In an embodiment, the remote control device determines the signal based on the command received from the user and/or the information received from the second media device (Step 350). Determining the signal may be as simple as receiving all the information including the signal from the second media device. Determining the signal may include determining an operation code based on the command received by accessing a locally stored table which maps commands received to operation codes. Determining the signal may include combining the operation code with information identifying the target media device received from the second media device. In an embodiment, only state information may be received from the target media device describing a current display. Based on the current display and the command received (e.g., an up button or a select button), the remote control device may determine the signal to be transmitted to the target media device.

For example, a target media device may be a set top box receiving a broadcast stream from a broadcast service, where the broadcast stream corresponds to channel two on a user display. While the broadcast stream is being displayed to the user, an up arrow command may be received on the remote control device. The remote control device may request state information from the second media device which may return information to the remote control device that indicates that channel two is being displayed to the user. Based on the current display of channel two and receiving an up arrow command, the remote control device may determine that the user has selected channel three for display. In response to the determination, the remote control device may then transmit a signal to the target media device indicating that channel three has been selected. The target media device may perform a function based on the signal received from the remote control device (Step 360). Step 360 is similar to 240 described above. Continuing the example, the target media device may then request content being broadcasted on Channel Three from the broadcast service and cause display of the content to the user. The remote control device may accordingly operate in a bi-directional mode by transmitting and receiving signals, in response to a single user command.

12.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
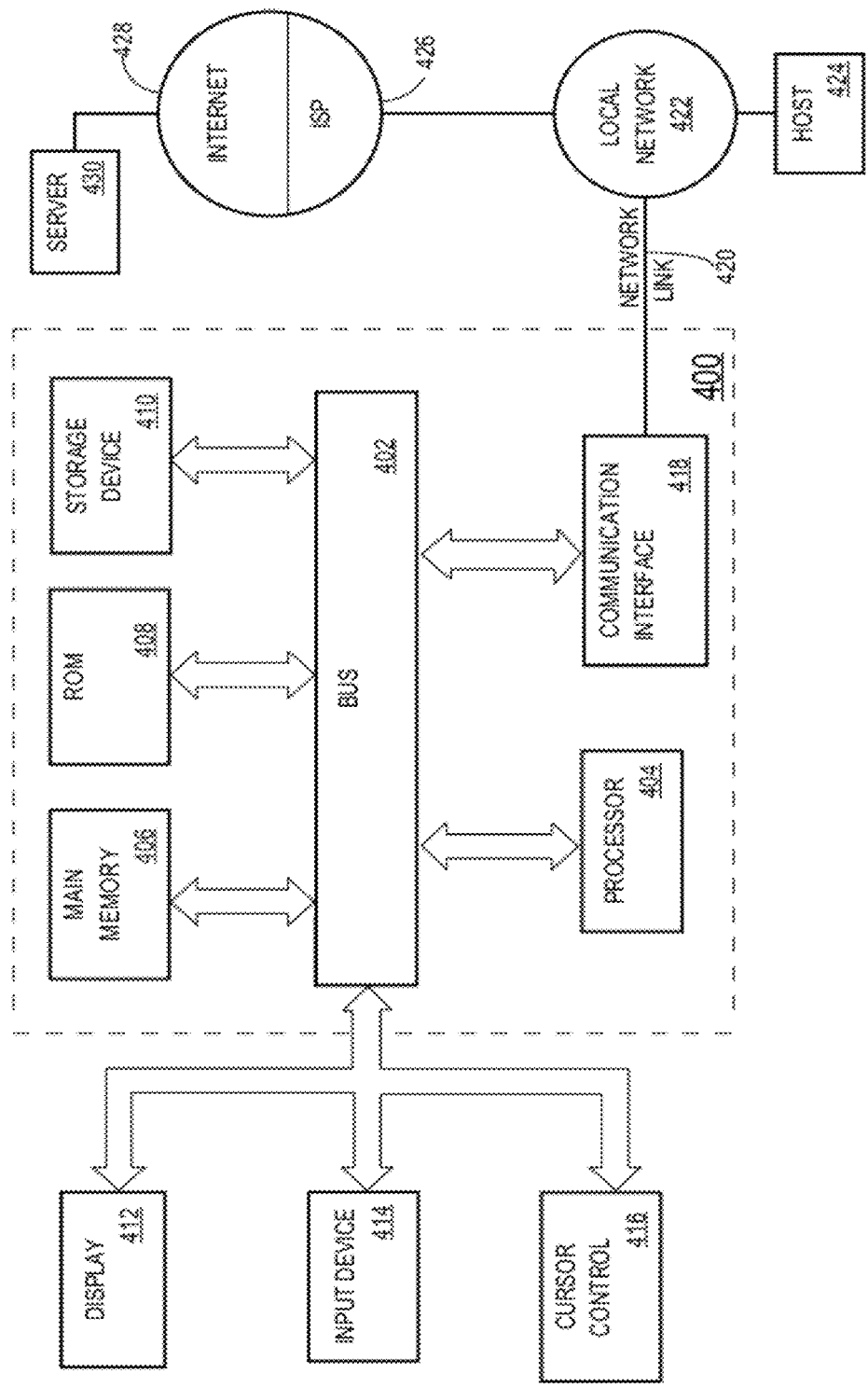
FIG. 4 shows a block diagram that illustrates a system upon which an embodiment of the invention may be implemented.

For example, FIG. 4 is a block diagram that illustrates a System 400 upon which an embodiment of the invention may be implemented. System 400 includes a bus 402 or other communication mechanism for communicating information, and a hardware processor 404 coupled with bus 402 for processing information. Hardware processor 404 may be, for example, a general purpose microprocessor.

System 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render System 400 into a special-purpose machine that is customized to perform the operations specified in the instructions.

System 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

System 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 441, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

System 400 may implement the techniques described herein using customized hard-wired logic, one or more ASICs or FPGAs, firmware and/or program logic which in combination with the System causes or programs System 400 to be a special-purpose machine. According to one embodiment, the techniques herein are performed by System 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to System 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

System 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 424. ISP 424 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from System 400, are example forms of transmission media.

System 400 can send messages and receive data, including program code, through the network(s), network link 420 and communication interface 418. In the Internet example, a server 430 might transmit a requested code for an application program through Internet 428, ISP 424, local network 422 and communication interface 418.

The received code may be executed by processor 404 as it is received, and/or stored in storage device 410, or other non-volatile storage for later execution.

13.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
    detecting that a particular media device is newly communicatively coupled to one or more media devices in a set of media devices, the one or more media devices being controlled by a remote control device;
    in response to detecting that the particular media device is newly communicatively coupled to the one or more media devices in the set of media devices, a media device in the set of media devices performing:
        automatically sending one or more remote operating codes, for remotely controlling the particular media device, to the remote control device;
        automatically detecting a user interface stored on the particular media device;
        transmitting the user interface to the remote control device.

2. The method of claim 1, wherein each device in the set of media devices is communicatively coupled with at least one other device in the set of media devices, and the step of detecting is responsive to the particular media device establishing a communication channel with the one or more media devices in the set of media devices.

3. The method of claim 1, wherein the remote control operating codes are sent to the remote control device via Bluetooth.

4. The method of claim 1, wherein automatically sending the one or more operating codes is further in response to the remote control device periodically polling at least one media device in the set of media devices for remote operating codes for remotely controlling any device that has been newly communicatively coupled to the set of devices.

5. The method of claim 1, wherein in response to detecting that the particular media device is newly communicatively coupled to the one or more media devices in the set of media devices, physical buttons on the remote control device are reconfigured to operate features associated with the particular media device.

6. The method of claim 1, wherein the method is performed by a media device in the set of media devices.

7. The method of claim 1, further comprising:
    detecting one or more new features associated with the particular media device;
    responsive to detecting the one or more new features, automatically configuring the remote control device for selecting the one or more new features.

8. The method of claim 7, wherein the detecting the one or more new features is performed by the particular media device or by one or more media devices in the set of media devices.

9. The method of claim 7, wherein the detecting the one or more new features is performed by the remote control device at least in part by: the remote control device polling the particular media device or at least one media device in the set of media devices.

10. The method of claim 7, wherein automatically configuring the remote control device comprises the remote control device requesting remote operating codes, from the particular media device or at least one media device in the set of media devices, for selecting the one or more new features.

11. The method of claim 7, wherein automatically configuring the remote control device comprises sending, by the particular media device or at least one device in the set of media devices, remote operating codes for selecting the one or more new features.

12. A computer readable medium comprising instructions which, when executed by one or more processors, cause performance of steps comprising:
    detecting that a particular media device is newly communicatively coupled to one or more media devices in a set of media devices, the one or more media devices being controlled by a remote control device;
    in response to detecting that the particular media device is newly communicatively coupled to the one or more media devices in the set of media devices, a media device in the set of media devices performing:
        automatically sending one or more remote operating codes, for remotely controlling the particular media device, to the remote control device;
        automatically detecting a user interface stored on the particular media device;
        transmitting the user interface to the remote control device.

13. The computer readable medium of claim 12, wherein each device in the set of media devices is communicatively coupled with at least one other device in the set of media devices, and the step of detecting is responsive to the particular media device establishing a communication channel with the one or more media devices in the set of media devices.

14. The computer readable medium of claim 12, wherein the remote control operating codes are sent to the remote control device via Bluetooth.

15. The computer readable medium of claim 12, wherein automatically sending the one or more operating codes is further in response to the remote control device periodically polling at least one media device in the set of media devices for remote operating codes for remotely controlling any device that has been newly communicatively coupled to the set of devices.

16. The computer readable medium of claim 12, wherein in response to detecting that the particular media device is newly communicatively coupled to the one or more media devices in the set of media devices, physical buttons on the remote control device are reconfigured to operate features associated with the particular media device.

17. The computer readable medium of claim 12, wherein the method is performed by a media device in the set of media devices.

18. The computer readable medium of claim 12, further comprising instructions which, when executed by the one or more processors, cause performance of steps comprising:
   detecting one or more new features associated with the particular media device;
   responsive to detecting the one or more new features, automatically configuring the remote control device for selecting the one or more new features.

19. The computer readable medium of claim 18, wherein the detecting the one or more new features is performed by the particular media device or by one or more media devices in the set of media devices.

20. The computer readable medium of claim 18, wherein the detecting the one or more new features is performed by the remote control device at least in part by: the remote control device polling the particular media device or at least one media device in the set of media devices.

21. The computer readable medium of claim 18, wherein automatically configuring the remote control device comprises the remote control device requesting remote operating codes, from the particular media device or at least one media device in the set of media devices, for selecting the one or more new features.

22. The computer readable medium of claim 18, wherein automatically configuring the remote control device comprises sending, by the particular media device or at least one device in the set of media devices, remote operating codes for selecting the one or more new features.

23. An apparatus comprising:
   one or more subsystems, implemented at least partially in hardware, that perform the steps of:
      detecting that a particular media device is newly communicatively coupled to one or more media devices in a set of media devices, the one or more media devices being controlled by a remote control device;
      in response to detecting that the particular media device is newly communicatively coupled to the one or more media devices in the set of media devices, a media device in the set of media devices performing:
         automatically sending one or more remote operating codes, for remotely controlling the particular media device, to the remote control device;
         automatically detecting a user interface stored on the particular media device;
         transmitting the user interface to the remote control device.

24. The apparatus of claim 23, wherein each device in the set of media devices is communicatively coupled with at least one other device in the set of media devices, and the step of detecting is responsive to the particular media device establishing a communication channel with the one or more media devices in the set of media devices.

25. The apparatus of claim 23, wherein the remote control operating codes are sent to the remote control device via Bluetooth.

26. The apparatus of claim 23, wherein automatically sending the one or more operating codes is further in response to the remote control device periodically polling at least one media device in the set of media devices for remote operating codes for remotely controlling any device that has been newly communicatively coupled to the set of devices.

27. The apparatus of claim 23, wherein in response to detecting that the particular media device is newly communicatively coupled to the one or more media devices in the set of media devices, physical buttons on the remote control device are reconfigured to operate features associated with the particular media device.

28. The apparatus of claim 23, wherein the method is performed by a media device in the set of media devices.

29. The apparatus of claim 23, further comprising a subsystem, implemented at least partially in hardware, that performs the steps of:
   detecting one or more new features associated with the particular media device;
   responsive to detecting the one or more new features, automatically configuring the remote control device for selecting the one or more new features.

30. The apparatus of claim 29, wherein the detecting the one or more new features is performed by the particular media device or by one or more media devices in the set of media devices.

31. The apparatus of claim 29, wherein the detecting the one or more new features is performed by the remote control device at least in part by: the remote control device polling the particular media device or at least one media device in the set of media devices.

32. The apparatus of claim 29, wherein automatically configuring the remote control device comprises the remote control device requesting remote operating codes, from the particular media device or at least one media device in the set of media devices, for selecting the one or more new features.

33. The apparatus of claim 29, wherein automatically configuring the remote control device comprises sending, by the particular media device or at least one device in the set of media devices, remote operating codes for selecting the one or more new features.

* * * * *